(12) United States Patent
Woolward et al.

(10) Patent No.: US 10,084,753 B2
(45) Date of Patent: *Sep. 25, 2018

(54) DELIVERING SECURITY FUNCTIONS TO DISTRIBUTED NETWORKS

(71) Applicant: vArmour Networks, Inc., Mountain View, CA (US)

(72) Inventors: Marc Woolward, Santa Cruz, CA (US); Choung-Yaw Shieh, Palo Alto, CA (US); Jia-Jyi Lian, Saratoga, CA (US)

(73) Assignee: vArmour Networks, Inc., Mountain View, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/342,982

(22) Filed: Nov. 3, 2016

(65) Prior Publication Data
US 2017/0078247 A1  Mar. 16, 2017

Related U.S. Application Data

(63) Continuation of application No. 14/677,755, filed on Apr. 2, 2015, now Pat. No. 9,525,697.

(51) Int. Cl.
*H04L 29/06* (2006.01)
*G06F 21/55* (2013.01)
(Continued)

(52) U.S. Cl.
CPC .......... *H04L 63/0263* (2013.01); *G06F 21/53* (2013.01); *G06F 21/552* (2013.01);
(Continued)

(58) Field of Classification Search
CPC ............. H04L 63/1458; H04L 63/0227; H04L 63/1441; H04L 2463/141; H04L 63/0236; G06F 21/552; G06F 21/57
See application file for complete search history.

(56) References Cited

U.S. PATENT DOCUMENTS 6,651,099 B1  11/2003  Dietz et al.
6,765,864 B1   7/2004  Natarajan et al.
(Continued)

FOREIGN PATENT DOCUMENTS

TW       201703486 A     1/2017
WO   WO2011012165 A1    2/2011
(Continued)

OTHER PUBLICATIONS

Wonghirunsombat, Ekgapark et al., "A Centralized Management Framework of Network-based Intrusion Detection and Prevention System," 2013 10th International Joint Conference on Computer Science and Software Engineering (JCSSE), May 29, 2013, pp. 183-188.

(Continued)

*Primary Examiner* — James R Turchen
(74) *Attorney, Agent, or Firm* — Carr & Ferrell LLP

(57) ABSTRACT

Systems and methods for delivering security functions to a distributed network are described herein. An exemplary method may include: processing a data packet received from a switch, the data packet directed to the at least one network asset; selectively forwarding the data packet using the processing and a rule set; inspecting the forwarded packet; directing the enforcement point to at least one of forward the data packet to the at least one network asset and drop the data packet, using the inspection and the rule set; accumulating data associated with at least one of the data packet, the processing, and the inspection; analyzing the at least one of the data packet, the processing, and the inspection; and initiating compilation of a high-level security policy by the compiler using the analysis to produce an updated rule set.

19 Claims, 7 Drawing Sheets

(51) Int. Cl.
*G06F 21/53* (2013.01)
*G06F 21/57* (2013.01)

(52) U.S. Cl.
CPC ...... *H04L 63/0227* (2013.01); *H04L 63/0236* (2013.01); *H04L 63/1408* (2013.01); *H04L 63/1425* (2013.01); *H04L 63/1433* (2013.01); *H04L 63/1441* (2013.01); *H04L 63/1458* (2013.01); *H04L 63/20* (2013.01); *G06F 21/57* (2013.01); *H04L 2463/141* (2013.01)

(56) References Cited

U.S. PATENT DOCUMENTS

| | | | |
|---|---|---|---|
| 6,862,264 | B1 | 3/2005 | Moura et al. |
| 6,970,459 | B1 | 11/2005 | Meier |
| 6,983,325 | B1 | 1/2006 | Watson et al. |
| 6,992,985 | B1 | 1/2006 | Das |
| 7,028,179 | B2 * | 4/2006 | Anderson ............ H04L 63/0227 709/224 |
| 7,062,566 | B2 | 6/2006 | Amara et al. |
| 7,464,407 | B2 * | 12/2008 | Nakae ................ H04L 63/0227 713/182 |
| 7,542,455 | B2 | 6/2009 | Grayson et al. |
| 7,620,986 | B1 * | 11/2009 | Jagannathan ....... H04L 63/1425 713/150 |
| 7,742,414 | B1 | 6/2010 | Lannaccone et al. |
| 7,774,837 | B2 | 8/2010 | McAlister |
| 7,804,787 | B2 | 9/2010 | Brandyburg et al. |
| 7,844,839 | B2 | 11/2010 | Palmer et al. |
| 7,849,495 | B1 | 12/2010 | Huang |
| 7,986,938 | B1 | 7/2011 | Meenan et al. |
| 8,214,679 | B2 | 7/2012 | Ishikawa et al. |
| 8,259,571 | B1 | 9/2012 | Raphel et al. |
| 8,274,912 | B2 | 9/2012 | Wray et al. |
| 8,464,255 | B2 | 6/2013 | Nathuji et al. |
| 8,578,465 | B2 | 11/2013 | Xiao et al. |
| 8,798,055 | B1 | 8/2014 | An |
| 8,949,986 | B2 | 2/2015 | Ben-Shalom et al. |
| 8,955,093 | B2 | 2/2015 | Shieh et al. |
| 8,984,114 | B2 | 3/2015 | Shieh et al. |
| 9,038,151 | B1 * | 5/2015 | Chua ..................... H04L 45/02 709/223 |
| 9,264,441 | B2 | 2/2016 | Todd et al. |
| 9,338,176 | B2 | 5/2016 | Trumbull et al. |
| 9,483,317 | B1 | 11/2016 | Shieh et al. |
| 9,525,697 | B2 | 12/2016 | Woolward et al. |
| 9,621,568 | B2 | 4/2017 | Shieh |
| 9,742,732 | B2 | 8/2017 | Sun et al. |
| 2002/0019886 | A1 * | 2/2002 | Sanghvi ................ G06F 9/542 719/318 |
| 2002/0031103 | A1 | 3/2002 | Wiedeman et al. |
| 2002/0032717 | A1 | 3/2002 | Malan et al. |
| 2003/0014665 | A1 * | 1/2003 | Anderson ............ H04L 63/0227 726/4 |
| 2003/0035397 | A1 | 2/2003 | Haller et al. |
| 2003/0123481 | A1 | 7/2003 | Neale et al. |
| 2003/0135625 | A1 | 7/2003 | Fontes et al. |
| 2003/0177389 | A1 | 9/2003 | Albert et al. |
| 2003/0236985 | A1 | 12/2003 | Ruuth |
| 2004/0030927 | A1 | 2/2004 | Zuk |
| 2004/0062204 | A1 | 4/2004 | Bearden et al. |
| 2004/0093513 | A1 | 5/2004 | Cantrell et al. |
| 2004/0095897 | A1 | 5/2004 | Vafaei |
| 2004/0103205 | A1 | 5/2004 | Larson et al. |
| 2004/0172618 | A1 | 9/2004 | Marvin |
| 2004/0214576 | A1 | 10/2004 | Myers et al. |
| 2004/0250124 | A1 | 12/2004 | Chesla et al. |
| 2005/0060573 | A1 * | 3/2005 | D'Souza ............ H04L 63/1441 726/4 |
| 2005/0114288 | A1 | 5/2005 | Dettinger et al. |
| 2005/0201343 | A1 | 9/2005 | Sivalingham et al. |
| 2006/0005231 | A1 | 1/2006 | Zuk et al. |
| 2006/0050696 | A1 | 3/2006 | Shah et al. |
| 2006/0085852 | A1 * | 4/2006 | Sima ..................... G06F 21/552 726/22 |
| 2006/0101520 | A1 * | 5/2006 | Schumaker ........... G06F 21/554 726/25 |
| 2006/0137009 | A1 * | 6/2006 | Chesla ................. G06F 21/552 726/22 |
| 2006/0150250 | A1 | 7/2006 | Lee et al. |
| 2006/0242701 | A1 | 10/2006 | Black et al. |
| 2007/0019621 | A1 | 1/2007 | Perry et al. |
| 2007/0079308 | A1 | 4/2007 | Chiaramonte et al. |
| 2007/0162968 | A1 | 7/2007 | Ferreira et al. |
| 2008/0077705 | A1 | 3/2008 | Li et al. |
| 2008/0083011 | A1 | 4/2008 | McAlister et al. |
| 2008/0086772 | A1 * | 4/2008 | Chesla ................. H04L 63/145 726/23 |
| 2008/0155239 | A1 | 6/2008 | Chowdhury et al. |
| 2008/0168135 | A1 * | 7/2008 | Redlich .................. G06Q 10/10 709/204 |
| 2008/0222375 | A1 | 9/2008 | Kotsovinos et al. |
| 2008/0301770 | A1 | 12/2008 | Kinder |
| 2009/0103524 | A1 * | 4/2009 | Mantripragada ... H04L 65/1079 370/352 |
| 2009/0182835 | A1 * | 7/2009 | Aviles .................. G06F 12/0813 709/213 |
| 2009/0228966 | A1 | 9/2009 | Parfene et al. |
| 2009/0268667 | A1 | 10/2009 | Gandham et al. |
| 2010/0043068 | A1 | 2/2010 | Varadhan et al. |
| 2010/0095367 | A1 | 4/2010 | Narayanaswamy |
| 2010/0104094 | A1 | 4/2010 | Takashima |
| 2010/0125900 | A1 * | 5/2010 | Dennerline ......... H04L 63/1416 726/13 |
| 2010/0132031 | A1 | 5/2010 | Zheng |
| 2010/0189110 | A1 * | 7/2010 | Kambhampati ........ H04L 45/00 370/400 |
| 2010/0235880 | A1 | 9/2010 | Chen et al. |
| 2010/0235902 | A1 | 9/2010 | Guo et al. |
| 2011/0003580 | A1 | 1/2011 | Belrose et al. |
| 2011/0010515 | A1 | 1/2011 | Ranade |
| 2011/0013776 | A1 | 1/2011 | McAlister |
| 2011/0055921 | A1 | 3/2011 | Narayanaswamy et al. |
| 2011/0069710 | A1 | 3/2011 | Naven et al. |
| 2011/0075667 | A1 * | 3/2011 | Li ......................... H04L 12/4633 370/392 |
| 2011/0138468 | A1 | 6/2011 | Chaudhry et al. |
| 2011/0225624 | A1 | 9/2011 | Sawhney et al. |
| 2011/0263238 | A1 | 10/2011 | Riley et al. |
| 2012/0017258 | A1 | 1/2012 | Suzuki |
| 2012/0036567 | A1 | 2/2012 | Senese et al. |
| 2012/0131685 | A1 | 5/2012 | Broch et al. |
| 2012/0207039 | A1 | 8/2012 | Srinivasan et al. |
| 2012/0294158 | A1 | 11/2012 | Boot et al. |
| 2013/0086383 | A1 * | 4/2013 | Galvao de Andrade ..................... H04L 9/0897 713/171 |
| 2013/0086399 | A1 | 4/2013 | Tychon et al. |
| 2013/0091264 | A1 | 4/2013 | Shieh et al. |
| 2013/0097692 | A1 | 4/2013 | Cooper et al. |
| 2013/0111542 | A1 | 5/2013 | Shieh |
| 2013/0152187 | A1 * | 6/2013 | Strebe .................. H04L 63/101 726/11 |
| 2013/0212670 | A1 * | 8/2013 | Sutardja ............. H04L 12/2878 726/13 |
| 2013/0212680 | A1 | 8/2013 | Winn et al. |
| 2013/0263245 | A1 | 10/2013 | Sun et al. |
| 2013/0329595 | A1 | 12/2013 | Scholz |
| 2014/0157265 | A1 | 6/2014 | Alanis et al. |
| 2014/0173731 | A1 * | 6/2014 | Mantripragada ....... H04L 12/66 726/22 |
| 2014/0245423 | A1 * | 8/2014 | Lee ..................... H04L 63/0218 726/12 |
| 2014/0279527 | A1 * | 9/2014 | Duke ................... G06Q 20/4016 705/44 |
| 2014/0283030 | A1 * | 9/2014 | Moore ............... H04L 63/0236 726/22 |
| 2014/0298469 | A1 * | 10/2014 | Marion .................. G06F 21/55 726/23 |
| 2015/0040220 | A1 | 2/2015 | Mantripragada et al. |

(56) References Cited

U.S. PATENT DOCUMENTS

| | | | |
|---|---|---|---|
| 2015/0052519 A1* | 2/2015 | Yu | G06F 9/45541 |
| | | | 718/1 |
| 2015/0186296 A1* | 7/2015 | Guidry | G06F 21/54 |
| | | | 713/193 |
| 2015/0229656 A1 | 8/2015 | Shieh | |
| 2016/0294858 A1 | 10/2016 | Woolward et al. | |
| 2017/0052827 A1 | 2/2017 | Shieh et al. | |
| 2017/0111272 A1 | 4/2017 | Liu et al. | |

FOREIGN PATENT DOCUMENTS

| | | |
|---|---|---|
| WO | WO2016160534 A2 | 10/2016 |
| WO | WO2017030912 A1 | 2/2017 |
| WO | WO2017066359 A1 | 4/2017 |

OTHER PUBLICATIONS

International Search Report dated Sep. 26, 2016 in Patent Cooperation Treaty Application No. PCT/US2016/046632 filed Aug. 11, 2016, pp. 1-9.

Bakshi et al. "Securing cloud from DDOS attacks using Intrusion Detection System in Virtual Machine", 2010 IEEE, pp. 260-264.

Patent Cooperation Treaty Application No. PCT/US2016/024119, "International Search Report" and "Written Opinion of the International Searching Authority," Dec. 16, 2016, 13 pages.

Patent Cooperation Treaty Application No. PCT/US2016/056695, "International Search Report" and "Written Opinion of the International Searching Authority," Dec. 23, 2016, 11 pages.

\* cited by examiner

DELIVERING SECURITY FUNCTIONS TO DISTRIBUTED NETWORKS

CROSS-REFERENCE TO RELATED APPLICATIONS

This application is a continuation of U.S. patent application Ser. No. 14/677,755, filed Apr. 2, 2015, now U.S. Pat. No. 9,525,697, issued on Dec. 20, 2016, which is hereby incorporated by reference herein in its entirety, including all references and appendices cited therein.

FIELD OF INVENTION

The present disclosure relates generally to data processing and, more particularly, to data network security.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Traditional client-server architecture of data networks tends to deliver security services in a non-distributed fashion. Firewalls, intrusion prevention systems, intrusion detection systems, and other security systems are typically located between a trusted network (e.g., an enterprise network), and a public network (e.g., the Internet), where the public network is normally assumed to be insecure. Thus, traditional security systems are positioned in such a way that network traffic needs to pass through the security systems before the trusted network can be reached.

A distributed network may include enterprise infrastructure resources spread over a number of networks, processors, and intermediary devices. Similarly, network traffic associated with a distributed network (e.g., an incoming traffic or data to be processed), can be spread over a plurality of virtual and/or physical machines (e.g., servers and hosts) within the distributed network. Thus, a distributed network lacks a single point of entry where traditional security systems can be positioned.

Currently, service providers and enterprises tend to use data centers established within distributed network environments. Because data centers are often occupied by multiple parties, data center providers cannot guarantee that each party occupying the data centers can be trusted. Thus, if an attacker gains access to one host within a data center, other hosts can become compromised as malware from the effected host can spread across the data center to assets of other parties. A traditional security system cannot prevent such an attack because the attack is occurring inside the data center well past any entry points where traditional security systems are normally located.

Furthermore, a traditional security system merely blocks malicious data traffic upon detection without performing any further analysis with regards to the attacker. This approach leaves the intent of the attacker unknown. Accordingly, no improvements to future security response are made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for delivering security functions to a distributed network. Some embodiments include a method comprising: getting a security policy for a data network, the security policy allowing and/or prohibiting communications between a plurality of network assets and indicating groupings of the plurality of network assets using a common security characteristic corresponding to the respective grouping; initiating compilation of the security policy to produce a rule set, the rule set blocking communication between specific ones of the plurality of network assets using at least one of a source address, source port, destination address, destination port, and an application protocol associated with the communication; providing the rule set to at least one enforcement point; receiving at least one of analytics and a log corresponding to communications in the data network, the at least one of analytics and a log produced by a logging module; calculating a risk score corresponding to the plurality of network asset, the risk score being a measurement of relative security corresponding to the plurality of network asset; initiating a re-compiling of the security policy to produce an updated rule set using the calculated risk score; and disseminating the updated rule set to the at least one enforcement point.

Various embodiments include a system comprising: a plurality of network assets; at least one enforcement point; a policy engine communicatively coupled to the at least one enforcement point, the policy engine generating a security policy for a data network that allows and/or prohibits communications between the plurality of network assets and indicating groupings of the plurality of network assets using a common security characteristic corresponding to the respective grouping; a compiler communicatively coupled to the policy engine, the compiler producing a rule set, the rule set blocking communication between specific ones of the plurality of network assets; a distributed security processor communicatively coupled to the policy engine, the compiler, and the at least one enforcement point, the distributed security processor providing the rule set to the at least one enforcement point; a logging module communicatively coupled to at least one of the switch, the enforcement point, and the distributed security processor, the logging module generating at least one of analytics and a log corresponding to communications in the data network; and an analytics module communicatively coupled to the logging module and the compiler, the analytics module calculating a risk score associated with the plurality of network assets, the risk score being a measurement of relative security corresponding to the plurality of network assets, the compiler producing an updated rule set using the risk score and the distributed security processor disseminating the updated rule set to the at least one enforcement point.

Some embodiments include a method comprising: generating, by a policy engine, a security policy for a data network, the security policy allowing and/or prohibiting communications between a plurality of network assets and indicating groupings of the plurality of network assets using a common security characteristic corresponding to the respective grouping; initiating, by a compiler, compilation of the security policy to produce a rule set, the rule set blocking communication between specific ones of the plurality of network assets using at least one of a source address, source port, destination address, destination port, and an application protocol associated with the communication; providing, by a distributed security processor, the rule set to at least one enforcement point; producing, by a logging module, at least one of analytics and a log corresponding to communications in the data network; calculating, by an analytics module, a risk score corresponding to the plurality of network asset, the risk score being a measurement of relative security corresponding to the plurality of network asset; initiating, by the analytics module, a re-compiling of the security policy by the compiler to produce an updated rule set using the calculated risk score; and disseminating, by the distributed security processor, the updated rule set to the at least one enforcement point.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
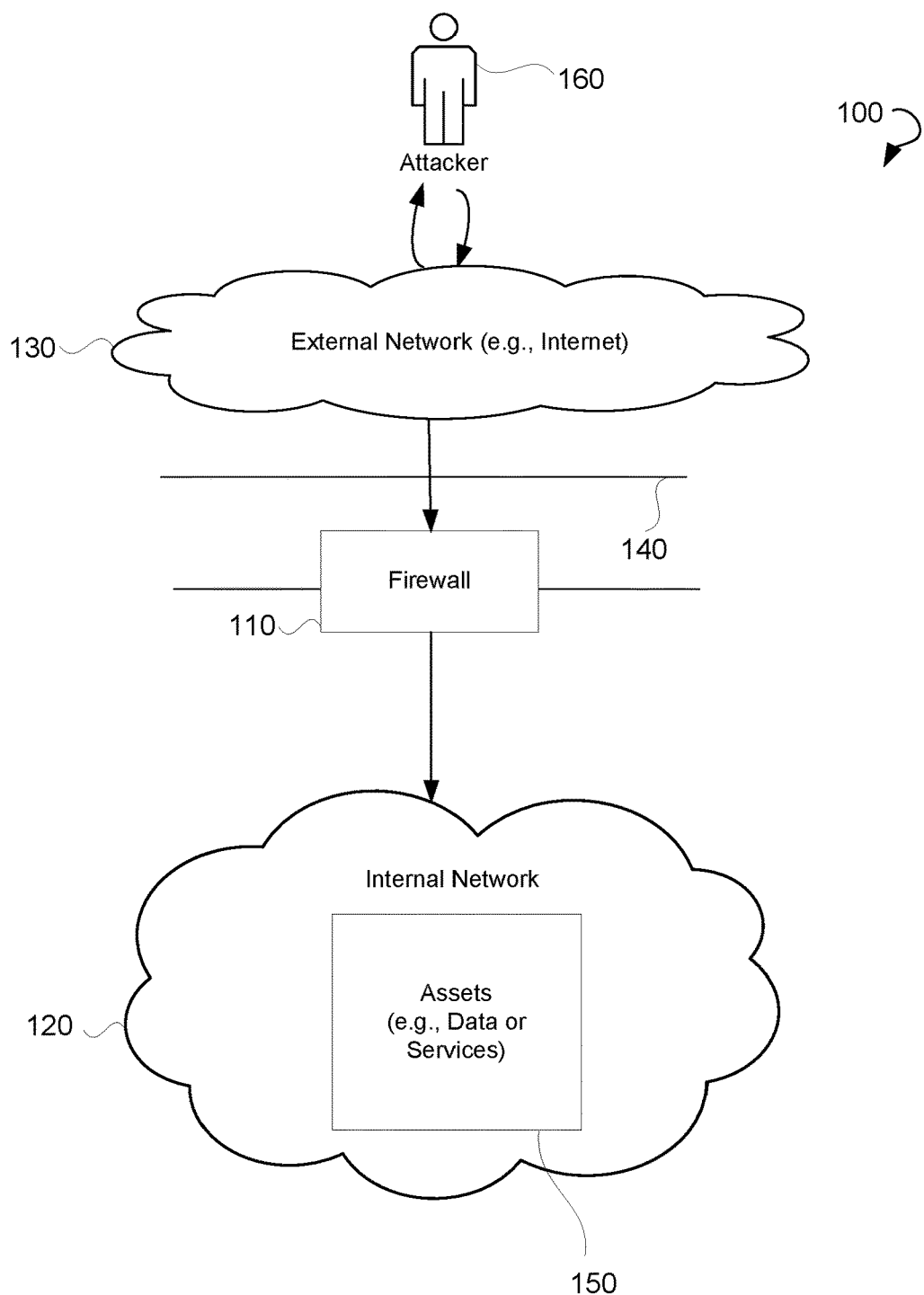
FIG. 1 shows an environment for securing a local area network, in accordance with some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Various embodiments of the present technology provide systems and methods for assessing and addressing communications within a data center including virtual machines. The system and method may identify insecure communications and may additionally stop and/or redirect the communication. The redirected communication may be directed to a surveillance communication node, which may isolate and prevent a security failure. The surveillance communication node may also spoof the sending communication node by sending communications that appear as if they were sent from the original intended target communication node. In this manner, a security failure may be prevented, the damage may be limited, and/or information about a bad actor attempting to initiate the security failure may be obtained.

The communication nodes discussed herein may be a virtual machine, a server, a cloud-based virtual machine, a host, a client, a workload and/or an electronic enforcement target. Communication packets as discussed herein include data packets or any other electronic communication between communication nodes.

Data centers present unique challenges with respect to security. Various virtual machines (VMs) may be used and may inhabit the same server. Different virtual machines may have different security levels, and/or may be associated with different organizations. Preventing security failures due to communications between virtual machines, without requiring all communication to pass through a single chokepoint, which would drastically undermine communication efficiency, is difficult.

A conventional data center rack or server may be part of a cloud system, and may include multiple hypervisors and multiple virtual machines per hypervisor, and a switch). The switch may regulate and monitor traffic between virtual machines within the server, and/or may connect the server to the outside, for example to the Internet, an intranet and/or other parts of the cloud system. A hypervisor is a virtual way of abstracting hardware for providing services to multiple guest operating systems. Two virtual machines on the same server can typically communicate, since a traditional, centralized firewall is unable to operate and prevent this type of interaction easily without drastically undermining communication efficiency. In contrast, a distributed firewall allows a virtual machine to communicate with adjacent or proximate virtual machines, while maintaining security.

Some embodiments of the present technology provide a distributed firewall to multiple communication nodes in a cloud environment. Some embodiments may include distributed security processors operating outside of the server housing the virtual machines, and/or may include additional elements, for instance, enforcement points in the switch of a server. The redirection by distributed security processors may be implemented in various ways, for example, by tunneling over a fabric of a distributed firewall, copying and sending a copy to a honeypot, sending TCP resets to prevent future communications, and/or by snooping IP addresses. Other actions by distributed security processors are also possible.

Traditionally, security services operated in a non-distributed fashion. For example, a firewall, an Internetwork Packet Exchange (IPX), and/or a honeypot were all positioned such that traffic necessarily passed through them. Additionally, each of these components was programmed individually. Historically, a bad actor had to access assets across the firewall.

In contrast, the threat model today is a cloud system with adjacent virtual machines. With multiple parties in a single data center, or even potentially on a single machine, the dynamic has changed.

The new model is a distributed firewall that sits across a data center. Security functions under the new model may be deployed using virtualization techniques. According to this new model, a distributed firewall is a stateful protocol capable of providing security enforcement and reporting, logging, and visibility. A distributed firewall is based on policy, requiring intervention based on signatures. These signatures may be, for example, the contents of a packet, or more macro level signatures. An actor behaving in a malevolent manner may be a signature for a distributed firewall, for example, a machine scanning a network.

FIG. 1 shows an environment 100 for securing a local area network (LAN). Security services in LANs can be delivered in a non-distributed fashion by firewalls, intrusion prevention systems, intrusion detection system, and so forth. The firewall 110 is usually placed as a barrier between a trusted secure internal network 120 and an unsecure external network 130, for example, the Internet, to form a trusted boundary 140 for the internal network 120. The internal network 120 may include assets 150, such as data or services. An attacker 160 may attempt to attack the internal network 120 by sending malicious requests. The task of the firewall 110 is to filter all network traffic coming to the internal network 120 and drop the malicious requests from the attacker 160.

However, traditional perimeter security solutions shown in environment 100 cannot adequately protect distributed data centers from attackers. A distributed data center may be occupied by multiple parties including enterprises, legal entities, and others that may not necessarily be trustworthy. Insiders in the distributed data center may attempt to attack network assets of other parties. Therefore, traditional entry-point security solutions, such as firewalls, may not be sufficient for protection of distributed data centers.

This disclosure provides methods and systems for delivering security functions to distributed networks. An example system of the present disclosure provides a distributed protection of network assets from potential threats within a data center or even across multiple data centers. The network assets may include data assets stored on a plurality of servers of the data center or multiple data centers. Alternatively or additionally, network assets may be physical hosts, virtual machines, and the like. More specifically, network packets of data traffic sent to a server within the data center can be received by an enforcement point implemented within a virtual machine. The virtual machine can be created and run by a hypervisor implemented as computer software, firmware, or hardware. After receiving the data traffic, the hypervisor may instruct a plurality of virtual machines acting as enforcement points to process the data traffic. Thus, the data traffic may be sent to the enforcement points. The enforcement points may be located across the data center and act at least as a distributed firewall to provide distributed protection to network assets within the data center.

The enforcement points may communicate with a policy engine. The policy engine may generate security policies to protect the network assets within the distributed network. The security policies may include rules for analyzing the data traffic based on either predetermined signatures contained in the data traffic or predefined state machines defining expected protocol behavior. The policy engine may provide security policies to the enforcement points. The enforcement points may apply security policies to the intercepted data traffic. Using the security policy, the enforcement points may determine whether the whole or a portion of the data traffic requires any treatment. In particular, the data traffic deemed malicious may be redirected to a distributed security processor and/or synthetic server or other security function (e.g., honeypot, tarpit, and/or intrusion protection system (IPS)). The synthetic server or other security function may include a host, data, or a network site that appears to be part of a distributed network, but may be, in fact, isolated and monitored. As used herein, "host" refers to any computer connected to the distributed network. The synthetic server or other security function may appear to contain information or a resource of value to the attacker. Such a synthetic server is sometimes referred to as a "honeypot". The synthetic server or other security function may analyze the malicious data traffic in an attempt to establish intent of the attackers and predict future actions of the attackers. The synthetic server or other security function may—additionally or alternatively—detect malicious behavior using pre-configured signatures, heuristic-based analysis, and the like.

The data traffic determined by the enforcement point as legitimate (i.e., containing no security threat) can be forwarded to intended destination servers without any further treatment (e.g., redirected to the distributed security processor or other security function). Furthermore, any future data traffic associated with the same connection can be approved and allowed to travel freely in both directions until the connection terminates. In some example embodiments, legitimate data traffic can be encrypted to improve security.

The example system of the current disclosure can provide distributed protection for network assets within the data center in a form of microservices. The microservices may include software architecture design patterns, in which complex applications (e.g., network security applications) may be composed of small, independent processes communicating with each other using APIs. The microservices can be small, highly decoupled and focused on doing small tasks, such as securing a portion of network assets. The system can enforce a single set of security policies across multiple facilities of the distributed network (i.e., across multiple network assets). Microservices are described further in related U.S. patent application Ser. No. 14/657,282, filed on Mar. 13, 2015, entitled "Methods and Systems for Providing Security to Distributed Microservices," which is hereby incorporated by reference in its entirety for all purposes.

Moreover, the exemplary system may provide protection for multiple data centers. For example, the system can be deployed within a public cloud network, thus allowing the joining of different types of security facilities together and enforcing a single set of security controls and policies. The system may include a single UI and a single API serving multiple security facilities so that the overall system looks like one security facility and provides security across private data centers associated with the public cloud network.

Figure 2:
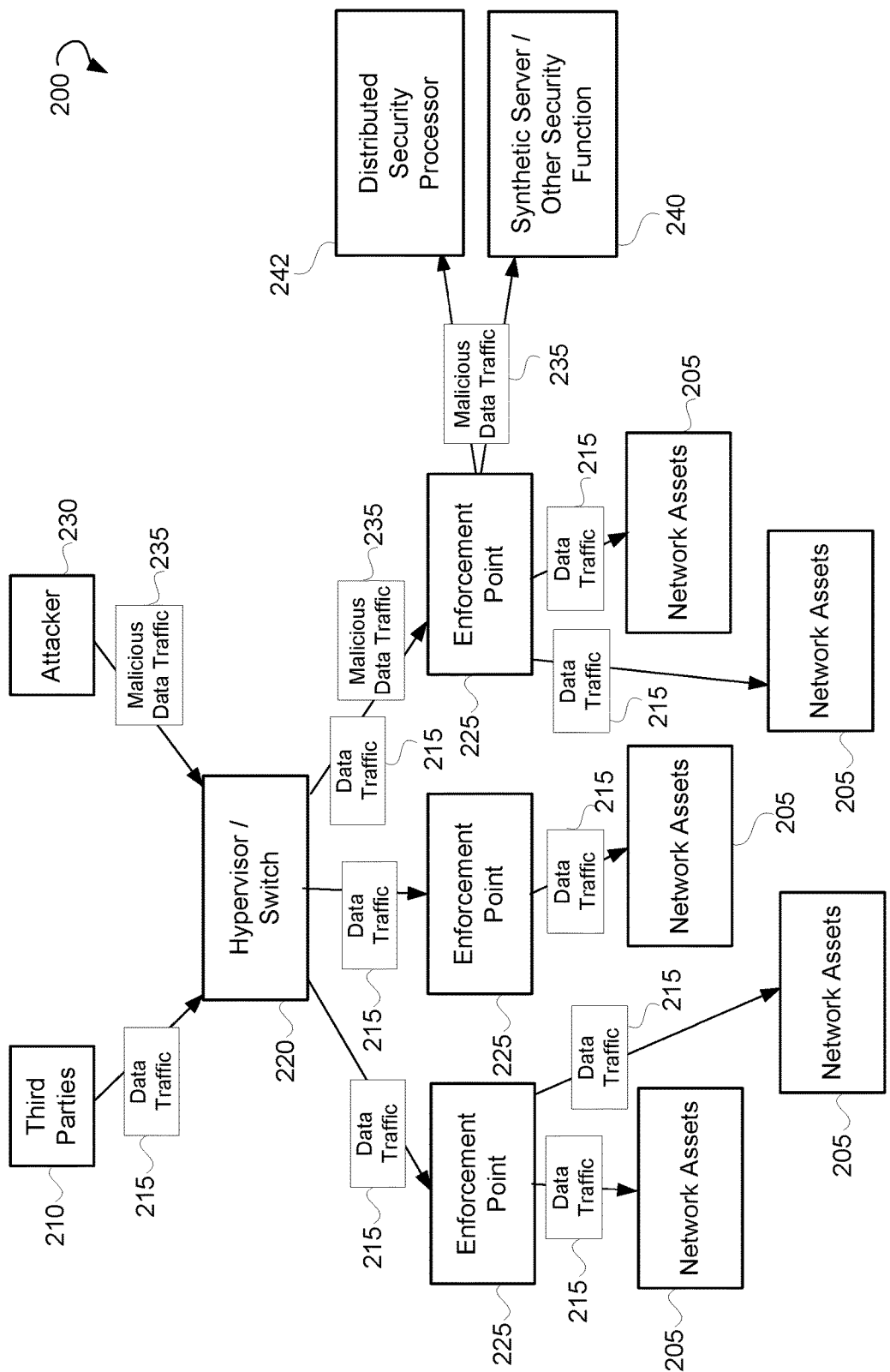
FIG. 2 illustrates an environment within which systems and methods for delivering security functions to a distributed network can be implemented, in accordance with some embodiments.

FIG. 2 illustrates an environment 200 within which systems and methods for delivering security functions to a distributed network can be implemented, in accordance with some embodiments. The environment 200 may include a (virtualized) environment within a distributed network (not shown). The environment 200 may include a plurality of network assets 205. The network assets 205 may include any of virtual and/or physical servers, hosts, data, or resources located within the distributed network. A plurality of third parties 210 may be located within the same distributed network and may initiate communications with the network assets 205. The third parties 210 may initiate communications by sending data traffic 215 to the network assets 205. The data traffic 215 sent by the third parties 210 may be forwarded by hypervisor or switch 220 to (one of) enforcement points 225. The hypervisor or switch 220 may be operable to create one or more virtual machines. The virtual machines created by the hypervisor or switch 220 may act as enforcement points 225. The enforcement points 225 may direct the intercepted data traffic 215 to the distributed security processor 242 and/or synthetic server or other security function 240. The enforcement points 225 may apply security policies to the data traffic 215 to provide individualized protection to the network assets 205. The enforcement points 225 may determine whether the data traffic 215 contains any threats to the network assets 205. The data traffic 215 posing no threats can be forwarded to the network assets 205.

An attacker 230 may intend to attack the network assets 205 by sending malicious data traffic 235. The malicious data traffic 235 may include malware traffic (e.g., botnet traffic), spyware, Denial-of-Service (DoS) attack traffic, spam, and the like. As the enforcement points 225 are responsible for intercepting data traffic directed to the network assets 205, the malicious data traffic 235 may be intercepted by the at least one of enforcement points 225. The hypervisor or switch 220 may send the intercepted malicious data traffic 235 to the enforcement points 225. Based on the security policies, the enforcement points 225 may determine that the malicious data traffic 235 poses threats to the network assets 205. Based on the determination, the enforcement points 225 may block (e.g., drop) and/or direct the malicious data traffic 235 to distributed security processor 242 and/or a synthetic server or other security function 240 created within the distributed network.

The synthetic server or other security function 240 may include a host that appears to contain data of value to the attacker 230 and, therefore, acts a "honeypot" for the attacker 230. By way of further non-limiting example, synthetic server or other security function 240 is a sandbox, tar pit, Intrusion Protection Systems (IPS), and the like. The synthetic server or other security function 240 may further analyze the malicious data traffic 235 to establish intent of the attacker 230 and to predict future malicious attempts of the attacker 230. The distributed security processor 242, for example, is not necessarily in the data traffic flow. The distributed security processor 242 may determine whether to block (e.g., drop) or redirect malicious data traffic 235 and may direct at least one of enforcement points 225 to take the determined action (e.g., block or redirect).

Figure 3:
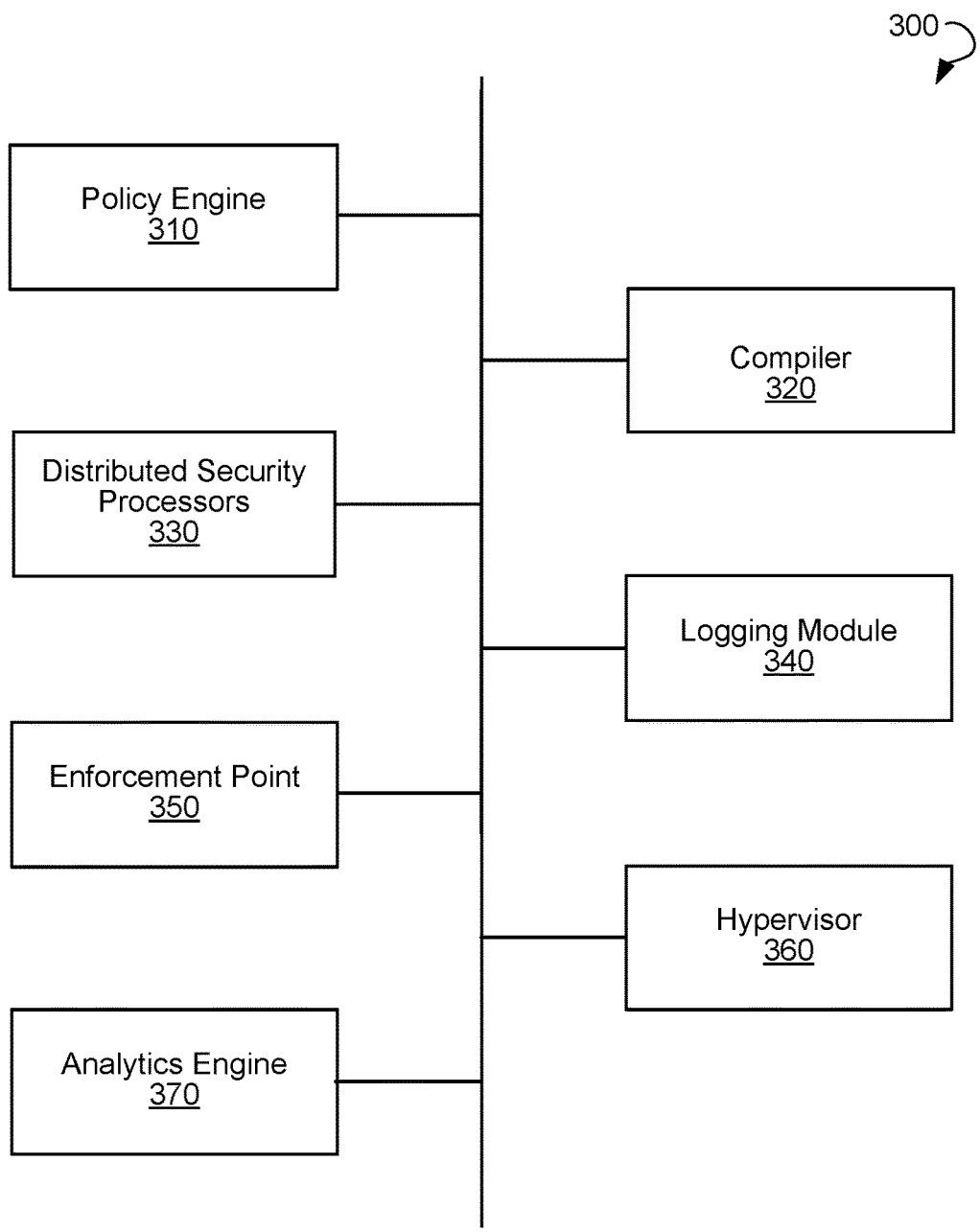
FIG. 3 is a block diagram showing various modules of a system for delivering security functions to a distributed network, in accordance with certain embodiments.

FIG. 3 is a block diagram showing various modules of a system 300 for delivering security functions to a distributed network, in accordance with certain embodiments. The system 300 may comprise a policy engine 310, a compiler 320, a plurality of distributed security processors 330, a logging module 340, an enforcement point 350, a hypervisor 360, and analytics engine 370. The policy engine 310 may be operable to generate at least one security policy for protection of a plurality of network assets within the distributed network. In example embodiments, the policy engine 310 includes at least one of the following: a UI to receive user input, an API, and at least one predetermined policy. In an example embodiment, the security policy includes a policy defined by a user, such as an operator of the distributed network, via the UI or the API. The compiler 320 may be operable to convert the at least one security policy into at least one rule set (e.g., firewall rule set). Policy engine 310, compiler 320, security policy, rule set, and associated methods are described further in related U.S. patent application Ser. No. 14/673,640, filed Mar. 30, 2015, entitled "Conditional Declarative Policies," which is hereby incorporated by reference in its entirety for all purposes.

In various embodiments, the compiler 320 may produce at least one rule set using analysis of data traffic 215 and/or malicious data traffic 235, which is described further in related U.S. patent application Ser. No. 14/673,679, filed Mar. 30, 2015, entitled "System and Method for Threat-Driven Security Policy Controls," which is hereby incorporated by reference in its entirety for all purposes.

In further example embodiments, the hypervisor 360 may run on a server associated with data assets and include an enforcement point 350 to intercept data traffic directed to the server.

In an example embodiment, the plurality of distributed security processors 330 may include virtual machines acting as stateful processors that store information concerning previously received data packets and use the stored information for processing the current data packets. The distributed security processors 330 may be operable to receive the at least one rule set and implement the at least one security policy for initiation of communications associated with the plurality of network assets. Therefore, each of the distributed security processors 330 may be configured as a policy enforcement point to provide individualized protection for the network assets.

In an example embodiment, the plurality of distributed security processors 330 may be further operable to instantiate a plurality of data paths to enable treatment of the communications associated with the plurality of network assets based on predetermined criteria. The treatment may include redirecting the communications deemed malicious to a synthetic server or other security function. The synthetic server may be designed to analyze the communications in an attempt to establish intent and predict future actions of a party associated with the communications. Additionally, the synthetic server may be configured so as to encourage an attacker to attempt an attack on the synthetic server such that data associated with the attacker can be collected and analyzed.

In some embodiments, the treatment includes creating synthetic Internet Protocol (IP) addresses on the distributed network that point to the synthetic server so that an attacker scanning IP addresses of the distributed network may hit the synthetic IP addresses and be directed to the synthetic server. In further embodiments of the disclosure, the treatment may include redirecting the communications deemed malicious to other security services.

In some example embodiments, the enforcement points 225 (FIG. 2) and/or 350 (FIG. 3) are configured as fast caches to execute fast forwarding based on decisions concerning forwarding of the communications.

In some embodiments, once the communications with the plurality of network assets are approved, the distributed security processors 330 may forward the communications to an intended destination for the rest of the connection. The distributed security processors 330 may include forwarding tables and data related to redirection of the communications. Therefore, for the rest of the session initiated between the party and a destination server, the communications may be directed to the destination server without further analysis.

In example embodiments, the implementation of at least one security policy includes analyzing the communications based on predetermined signatures or predefined state machines defining expected protocol behavior. The predetermined signatures may include at least one of the following: contents of a packet, a behavior of a party requesting the communications, a historical pattern, patterns indicative of malicious intent, a threatening behavior of the party, (e.g., scanning devices of the distributed network to understand network architecture), and so forth.

In a further example embodiment, the implementation of at least one security policy may include triggering the security functions based on predetermined trigger conditions. The triggering of the security functions may entail redirecting the communications by the enforcement point 350. The enforcement point 350 may be created within the hypervisor 360.

The logging module 340 may be operable to generate analytics and reports concerning data traffic and implementation of the security policy. The reports generated by the logging module 340 may provide visibility with respect to communications within the distributed network.

In some embodiments, analytics engine 370 analyzes analytics and reports, for example, generated by logging module 340. Analytics engine 370 may determine a change in data traffic (trend) and/or network assets, for example, using heuristics. For example, analytics engine 370 may calculate a (updated) risk score for at least one network asset. For example, compiler 320 (re-)compiles to produce a (updated) rule set using the change in data traffic and/or network assets. Using a determined change in data traffic and/or network assets (e.g., calculating an updated risk score) to generate a new rule set is described further in related U.S. patent application Ser. No. 14/673,679, filed Mar. 30, 2015, entitled "System and Method for Threat-Driven Security Policy Controls," which is hereby incorporated by reference in its entirety for all purposes.

Figure 4:
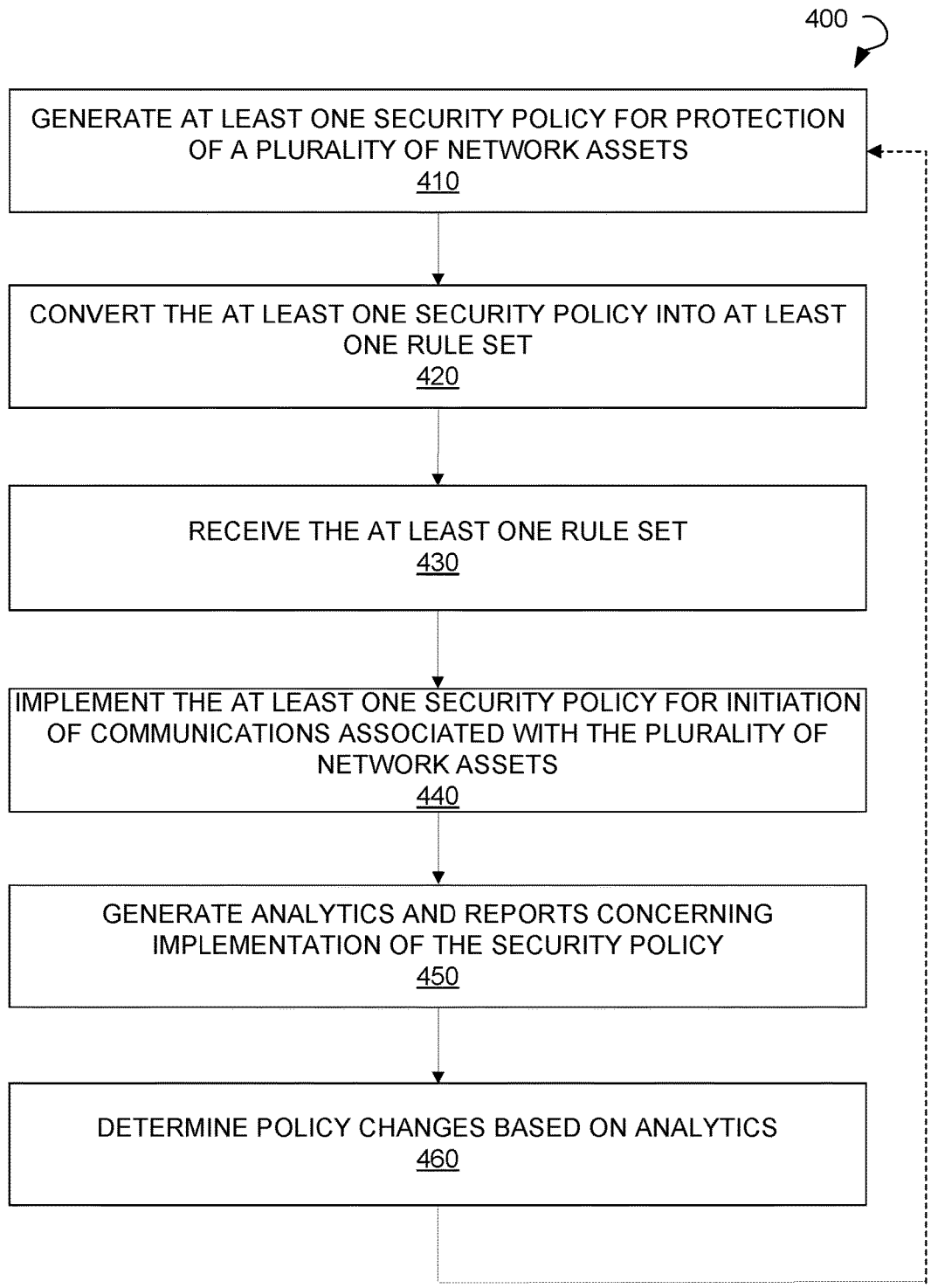
FIG. 4 is a flow chart illustrating a method for delivering security functions to a distributed network, in accordance with some example embodiments.

FIG. 4 is a flow chart illustrating a method 400 for delivering security functions to a distributed network, in accordance with some example embodiments. The method 400 may commence with generating at least one security policy at operation 410. The security policy may be generated by a policy engine for protection of a plurality of network assets within the distributed network. The policy engine may include at least one of the following: a UI to receive user input, an API, and at least one predetermined policy.

The method 400 may further include converting, by a compiler, the at least one security policy into at least one rule set at operation 420. After conversion, the at least one rule set may be received by a plurality of distributed security processors at operation 430.

The method 400 may further include operation 440, at which the at least one security policy may be implemented by the plurality of distributed security processors for initiation of communications associated with the plurality of network assets. Each of the plurality of distributed security processors may be configured to provide individualized protection for at least one of the plurality of network assets. In example embodiments, the implementation of at least one security policy includes analyzing the communications based on predetermined signatures or predefined state machines defining expected protocol behavior. The predetermined signatures may include at least one of the following: contents of a packet, a behavior of a party, a historical pattern, and so forth. In further example embodiments, the implementation of at least one security policy includes triggering the security functions based on predetermined trigger conditions. The triggering of the security functions may include redirecting the communications by an enforcement point. In further example embodiments, the implementation of at least one security policy includes encrypting data packets of the communications. At operation 450, analytics and reports concerning implementation of the security policy may be generated by a logging module. Based on the analytics generated at operation 450, policy changes may be determined at operation 460.

In some embodiments, the method 400 may further include instantiating a plurality of data paths to enable treatment of the communications associated with the plurality of network assets based on predetermined criteria. The plurality of data paths may be instantiated by the distributed security processors. The treatment may include redirecting the communications deemed malicious to a synthetic server. The synthetic server may be designed to analyze the communications in an attempt to establish intent and predict future actions of a party associated with the communications.

In some embodiments, once the communications with the plurality of network assets are approved, the distributed security processors may forward the communications to an intended destination for the rest of a connection.

Figure 5:
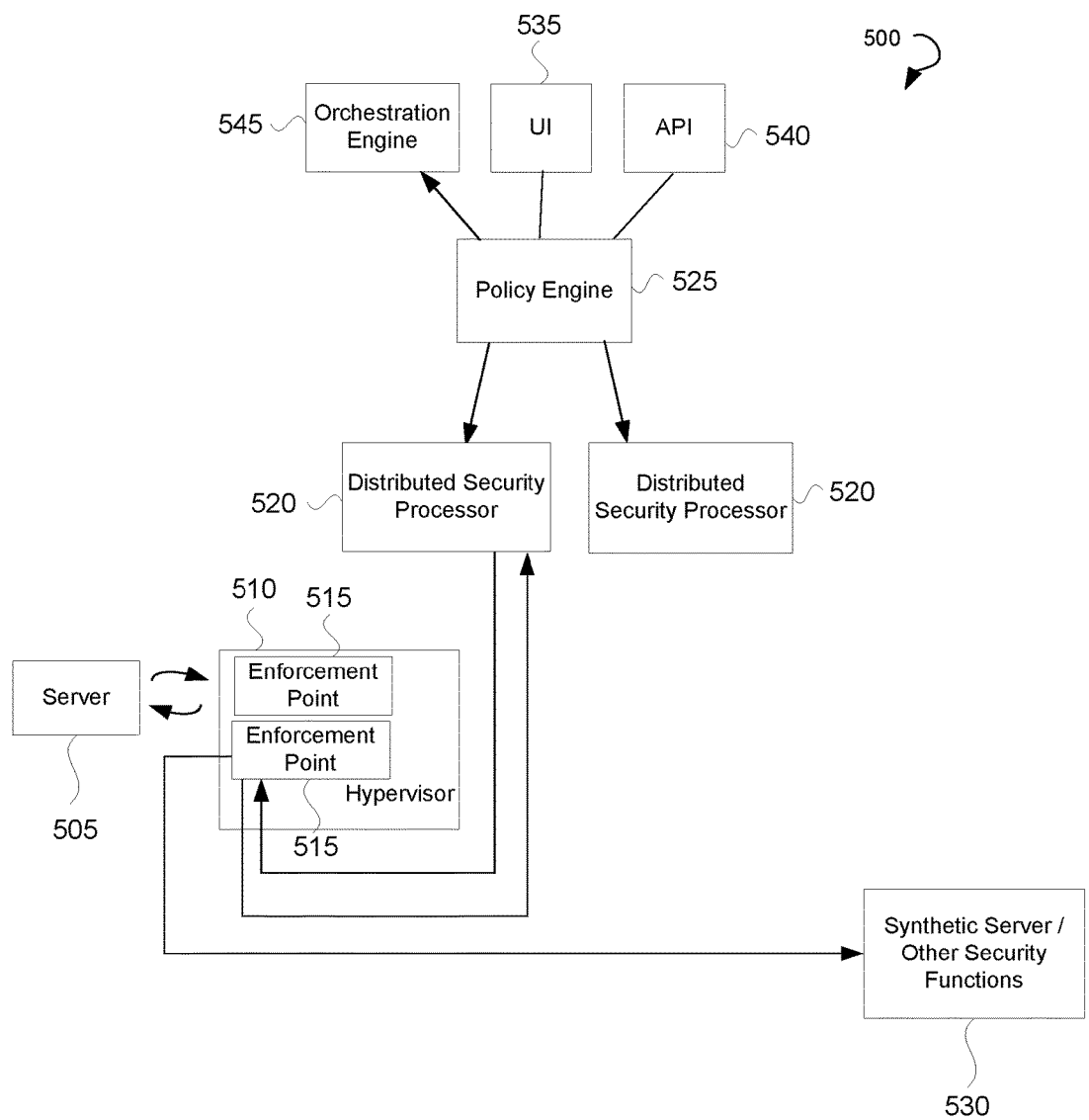
FIG. 5 shows a schematic diagram of delivering security functions to a server in a distributed network, in accordance with some example embodiments.

FIG. 5 shows a schematic diagram 500 of delivering security functions to a server in a distributed network, according to an example embodiment. A server 505 may be associated with a hypervisor 510. The hypervisor 510 may include one or more enforcement points 515 responsible for intercepting data traffic directed to the server 505 by a party (not shown) in the distributed network. The enforcement points 515 may direct the intercepted data traffic to one or more distributed security processors 520. A policy engine 525 may generate security policies and distribute the security policies to the distributed security processors 520 across the distributed network. The policy engine 525 may also be connected to UI 535, API 540, and an orchestration engine 545. The orchestration engine 545 may be used for controlling the hypervisor 510.

The distributed security processors 520 may process the intercepted data traffic based on security policies received from the policy engine 525 and make a decision whether the intercepted data traffic is malicious. The malicious data traffic may be forwarded, blocked (e.g., dropped) and/or redirected to a security service, such as a synthetic server or other security function 530 acting as a honeypot for an attacker associated with the malicious data traffic.

Figure 6:
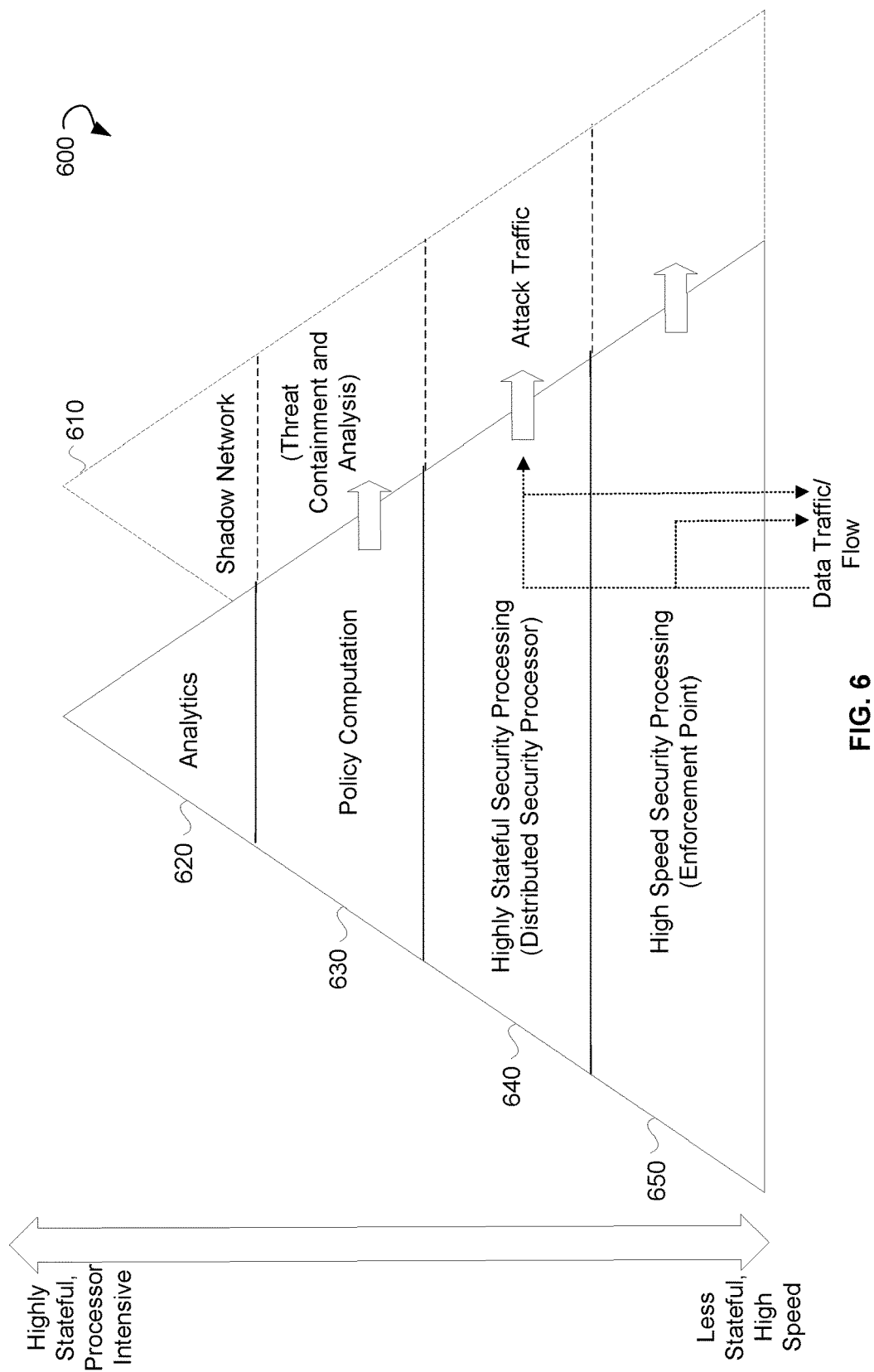
FIG. 6 shows a schematic diagram of redirecting data traffic to specific security services, in accordance with some example embodiments.

FIG. 6 shows a schematic diagram 600 of redirecting attack traffic to specific security services, shown as a shadow network 610. The schematic diagram 600 shows distribution of resources required for operations of the method for delivering security functions to a distributed network. In particular, (log) analytics 620 may be highly stateful and processor intensive. Policy computation 630 and highly stateful security processing 640 may be less processor intensive. Cache-based security processing 650 may be less stateful and high speed. All operations associated with threat containment and threat analysis of malicious data traffic may be redirected to the shadow network 610. The shadow network 610 may include a plurality of distributed security processors 640.

Figure 7:
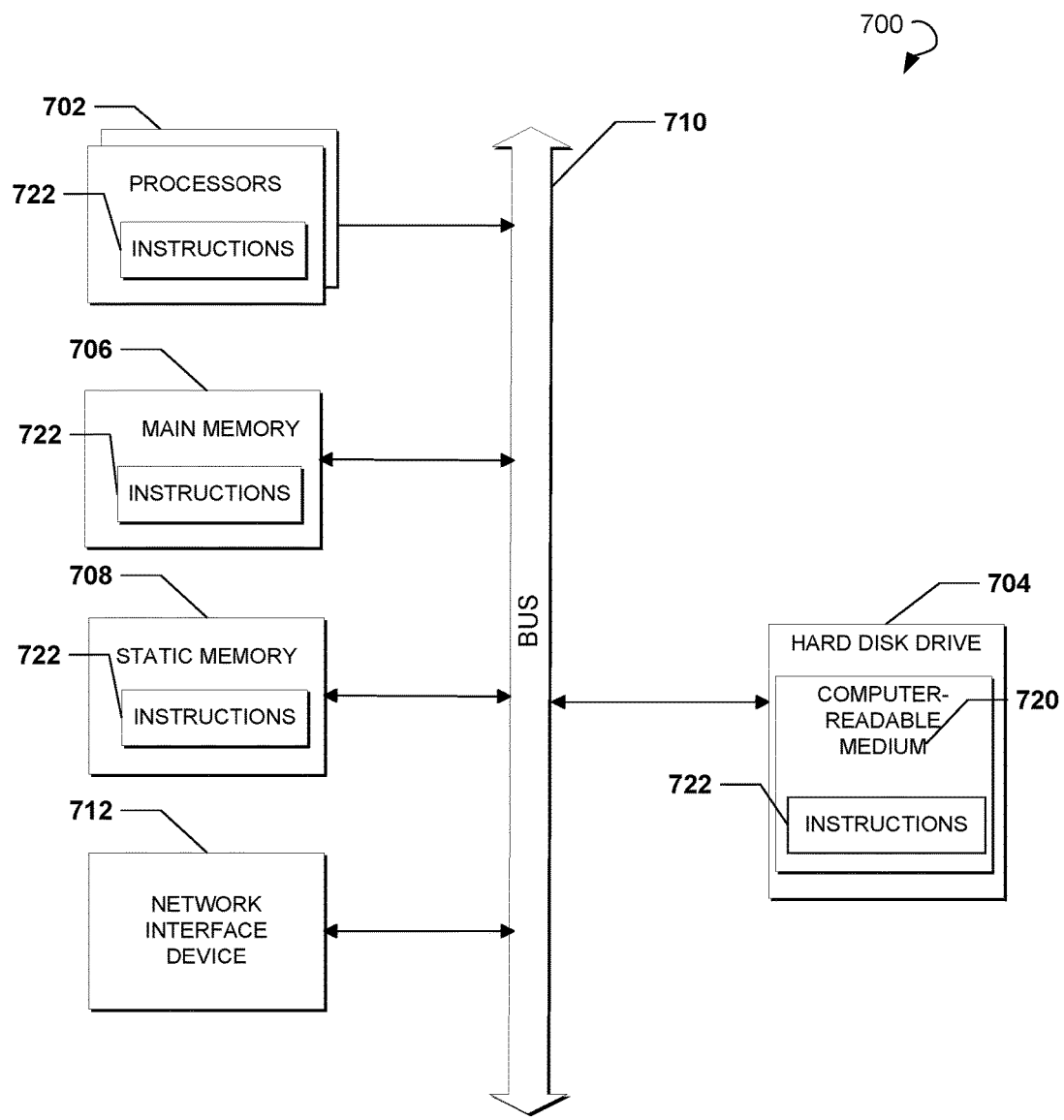
FIG. 7 shows a diagrammatic representation of a computing device for a machine in the exemplary electronic form of a computer system, within which a set of instructions for causing the machine to perform any one or more of the methodologies discussed herein, can be executed.

FIG. 7 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702, a hard disk drive 704, a main memory 706 and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or the static memory 708 and/or within the processors 702 during execution thereof by the computer system 700. The main memory 706, the static memory 708, and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, systems and methods for delivering security functions to a distributed network are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method comprising:
getting a security policy for a data network, the security policy allowing and/or prohibiting communications between a plurality of network assets and indicating groupings of the plurality of network assets using a common security characteristic corresponding to the respective grouping;
initiating compilation of the security policy to produce a rule set, the rule set blocking communication between specific ones of the plurality of network assets using at least one of a source address, source port, destination address, destination port, and an application protocol associated with the communication;
providing the rule set to at least one enforcement point;
receiving analytics corresponding to change in data traffic in the data network, the analytics produced by a logging module;
calculating a risk score corresponding to the analytics of the data network, the risk score being a measurement of relative security corresponding to the plurality of network assets;
initiating a re-compiling of the security policy to produce an updated rule set using the calculated risk score; and
disseminating the updated rule set to the at least one enforcement point.

2. The method of claim 1, further comprising:
analyzing the communications based on at least one of predetermined signatures and predefined state machines defining expected protocol behavior.

3. The method of claim 2, in which the predetermined signatures include at least one of contents of a packet, a behavior of a party, and a historical pattern.

4. The method of claim 2, further comprising:
triggering the analysis based on predetermined trigger conditions.

5. The method of claim 4, further comprising:
redirecting the communications by the at least one enforcement point.

6. The method of claim 1, further comprising:
processing, by the enforcement point and using the rule set, a data packet directed to at least one of the plurality of network assets.

7. The method of claim 6, further comprising:
determining the data packet is malicious; and
instantiating a plurality of data paths to enable treatment of communications corresponding to the at least one of the plurality of network assets, the treatment including redirecting malicious communications to a synthetic server.

8. The method of claim 7, further comprising:
analyzing, by the synthetic server, the malicious communications to ascertain intent and future actions of an originator of the malicious communications.

9. The method of claim 6, further comprising:
approving the data packet and the communications; and
forwarding the communications to an intended destination for a remainder of a connection.

10. A system comprising:
a plurality of hardware network assets;
at least one enforcement point;
a policy engine communicatively coupled to the at least one enforcement point, the policy engine generating a security policy for a data network that allows and/or prohibits communications between the plurality of hardware network assets and indicating groupings of the plurality of hardware network assets using a common security characteristic corresponding to the respective grouping;

a compiler communicatively coupled to the policy engine, the compiler producing a rule set, the rule set blocking communication between specific ones of the plurality of hardware network assets;

a distributed security processor communicatively coupled to the policy engine, the compiler, and the at least one enforcement point, the distributed security processor providing the rule set to the at least one enforcement point;

a logging module communicatively coupled to at least one of a switch, the at least one enforcement point, and the distributed security processor, the logging module generating analytics corresponding to change in data traffic in the data network; and an analytics module communicatively coupled to the logging module and the compiler, the analytics module calculating a risk score associated with the analytics of the data network, the risk score being a measurement of relative security corresponding to the plurality of hardware network assets, the compiler producing an updated rule set using the risk score and the distributed security processor disseminating the updated rule set to the at least one enforcement point.

11. The system of claim 10, in which the enforcement point processes, using the rule set, a data packet directed to at least one of the plurality of hardware network assets.

12. The system of claim 10, further comprising a plurality of distributed security processors, the distributed security processor being one of the plurality of distributed security processors, wherein each of the plurality of distributed security processors provides individualized protection for at least one of the plurality of hardware network assets.

13. The system of claim 10, in which the policy engine includes at least one of a user interface to receive user input, an application program interface, and at least one predetermined policy.

14. The system of claim 10, in which the at least one enforcement point and the plurality of hardware network assets are virtual machines.

15. The system of claim 10, further comprising:

a synthetic server communicatively coupled to the enforcement point, the synthetic server receiving a malicious data packet from the enforcement point and performing a security function, wherein the enforcement point processes the malicious data packet and forwards the malicious data packet to the synthetic server.

16. The system of claim 15, in which the synthetic server emulates operation of the plurality of hardware network assets and studies the malicious data packet to ascertain intent and future actions of an originator of the malicious data packet.

17. The system of claim 15, in which the synthetic server is at least one of a honeypot, a tarpit, and an intrusion protection system.

18. The system of claim 10, in which the distributed security processor, once the communications with the plurality of hardware network assets are approved, forwards communications to an intended destination for a remainder of a connection.

19. A method comprising:

generating, by a policy engine, a security policy for a data network, the security policy allowing and/or prohibiting communications between a plurality of network assets and indicating groupings of the plurality of network assets using a common security characteristic corresponding to the respective grouping;

initiating, by a compiler, compilation of the security policy to produce a rule set, the rule set blocking communication between specific ones of the plurality of network assets using at least one of a source address, source port, destination address, destination port, and an application protocol associated with the communication;

providing, by a distributed security processor, the rule set to at least one enforcement point;

producing, by a logging module, analytics corresponding to change in data traffic in the data network;

calculating, by an analytics module, a risk score corresponding to the analytics of the data network, the risk score being a measurement of relative security corresponding to the plurality of network asset;

initiating, by the analytics module, a re-compiling of the security policy by the compiler to produce an updated rule set using the calculated risk score; and disseminating, by the distributed security processor, the updated rule set to the at least one enforcement point.

* * * * *